Patented Sept. 26, 1933

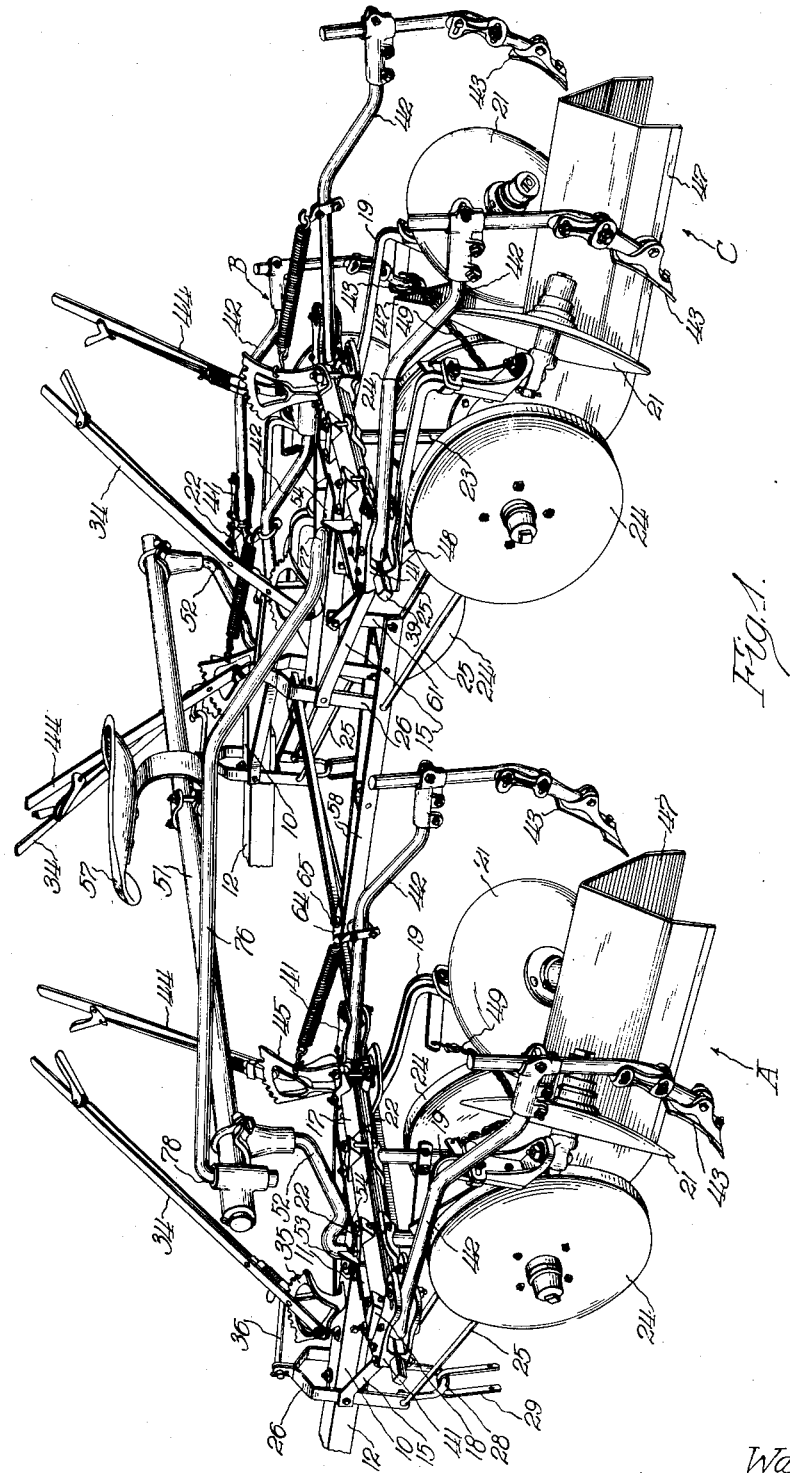

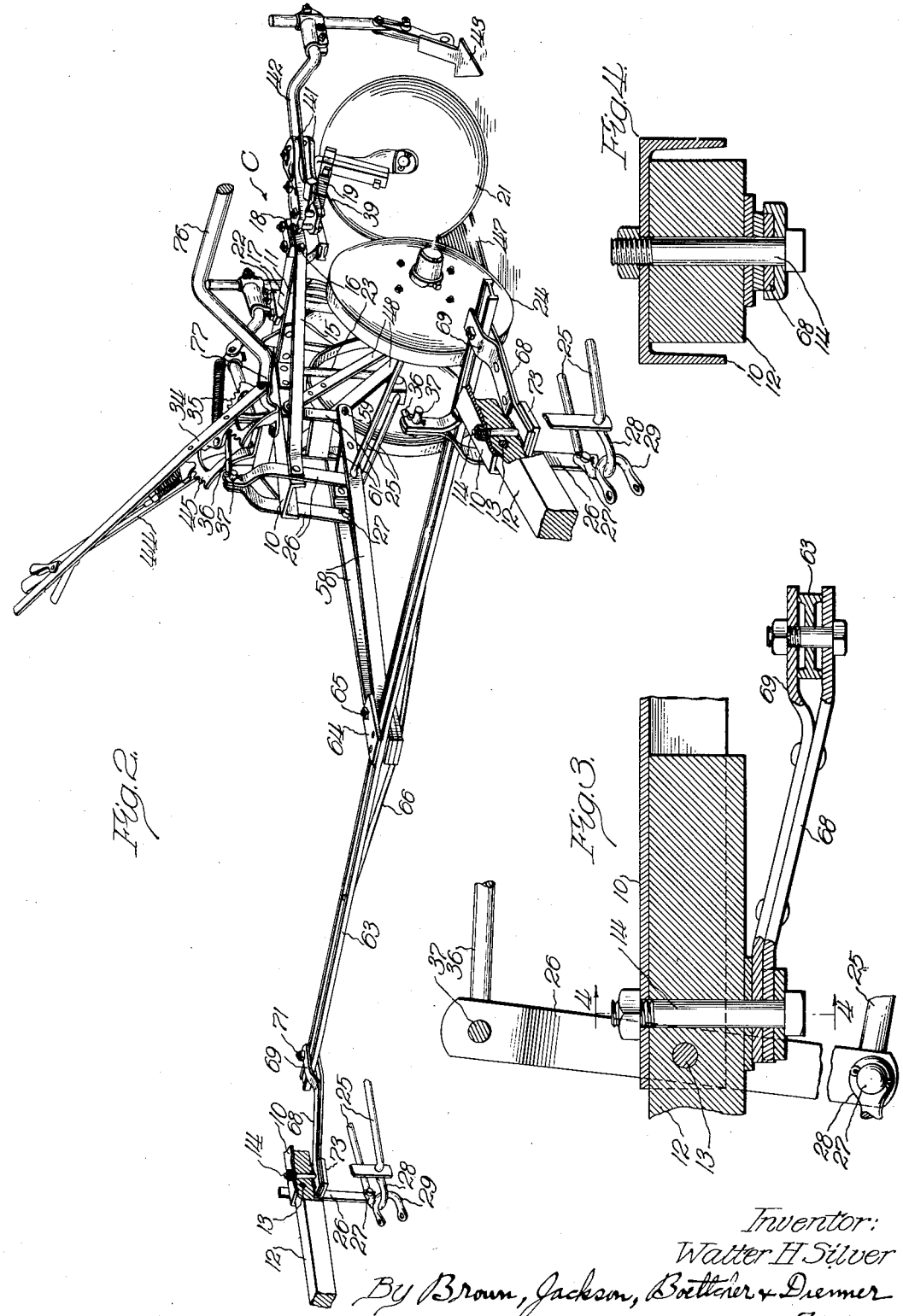

1,928,319

UNITED STATES PATENT OFFICE 1,928,319

LISTER CULTIVATOR

Walter H. Silver, Moline, Ill., assignor to Deere & Company, Moline, Ill., a corporation of Illinois Original application October 24, 1927, Serial No. 228,142. Divided and this application November 20, 1931. Serial No. 576,234

23 Claims. (Cl. 97—143)

This application is a division of the copending application filed by Theophilus Brown, Carl G. Strandlund and myself, October 24, 1927, Serial No. 228,142, and is particularly concerned with a new and improved draft connection between the draft frame and the third or intermediate unit in a three-row lister cultivator.

One of the particular objects of the invention disclosed in the copending application above was to provide such an implement wherein the three cultivator gangs are free to swing transversely, each independently of the others, so that each gang can follow its individual lister row. The lists are usually made with an implement which only makes one or two lists at a time, and, owing to unsteady driving of such implement, it frequently happens that the spacing between adjacent rows will vary considerably. Accordingly, it is important in a multiple row cultivator of this type that the separate cultivator gangs be capable of shifting laterally within certain limits, independently of each other, so that the gangs can accurately follow the lateral deviations in the rows. Such object was attained by an improved method of pivotally connecting the gangs together, which permits the two laterally disposed gangs to swing inwardly or outwardly relatively to each other, and which permits the intermediate gang to swing to either side independently of the laterally disposed gangs. Briefly, such structure included a transverse draft bar movably supported by the outer units and pivotally connected with the intermediate gang unit.

The principal object of the present invention is the provision of an improved connecting means by which the third or intermediate unit is held in upright position and for transmitting draft to the intermediate gang at a point corresponding to the point at which draft is applied to the outer units.

Other objects and advantages of the invention will appear at length in the following description of a preferred embodiment thereof. In the drawings illustrating such embodiment:

Figure 1 is a perspective view of the implement looking at the same from the left rear;

Figure 2 is a fragmentary front view in perspective illustrating the draft connections for the intermediate gang in detail;

Figure 3 is a longitudinal sectional view through the front end of one of the outer gangs; and Figure 4 is a section taken along the line 4—4 of Figure 3.

The implement as a whole comprises three lister cultivator gangs, the two outwardly disposed gangs being designated A and B, and the intermediate or center gang being designated C. The two laterally disposed gangs A and B are substantial duplicates, with the exception that one is a left hand unit and the other a right hand unit. The intermediate gang C is similar in construction to the outer gangs A and B, only differing therefrom in the manner of establishing the draft connection with the intermediate gang, which forms the subject matter of this application, and in the fact that such intermediate gang has no draft pole, as will hereinafter appear. Accordingly, I shall only describe one of these gangs in detail, and in this regard, attention is directed to the fact that these gangs correspond in their general construction to the gangs illustrated in Patent No. 1,148,613, issued to W. A. Paul on August 3, 1915.

Referring specifically to the gang or unit A, it will be noted that it comprises a frame which is built up of a longitudinally extending channel bar 10 and a transversely extending bar 11 at the rear end thereof. The transverse bar 11 extends across the rear end of the inverted channel bar 10 and is rigidly secured thereto by angle brackets or in any other suitable manner. Extending forwardly from the front end of the channel bar 10 is a draft member or pole 12, the channel bar 10 forming a socket in which the pole is rigidly secured by a horizontally extending bolt 13 (Figure 3), which passes through the side flanges of the channel bar and through the tongue, and also by a vertical bolt 14 which passes downwardly through the web of the channel 10 and through the tongue. It will be understood that the other gang unit B also has a draft pole 12 extending forwardly therefrom, which is connected to its channel bar 10 in the same manner.

The aforementioned frame consisting of the channel bar 10 and transverse bar 11 is braced by diagonally extending brace bars or rods 15 which are connected at their forward ends to the horizontally extending bolt 13. The rear ends of these diagonal brace bars are bent rearwardly and are provided with openings to receive bolts 16 which connect the ends of the bars 11 and 15. The bolts 16 also constitute pivots on which a tool carrying frame is pivotally mounted. Such tool carrying frame comprises primarily a tubular bar 17, preferably of square cross-section. Secured to the opposite ends of such bar are clamp devices or bracket members 18 which are clamped to the outer surface of the bar and which have forwardly extending pivot eyes having pivotal mounting on the bolts 16. Thus the tool carrying bar 17 and the frame 10—11 are capable of vertical pivotal movement relative to each other about the axis of the bolts 16.

Pivotally connected to the under sides of the two brackets 18, for horizontal swinging movement, are rearwardly extending arms 19 which carry suitable earth working tools at their rear ends. In the arrangement shown, I have illustrated discs 21 as being mounted on the arms 19, but it will be evident that shovels or any other desired type of earth working devices may be mounted on these arms in lieu of the discs 21. The arms 19 are adapted to be swung inwardly or outwardly to vary the distance between the earth working tools carried thereby, and to be clamped in any adjusted position by a suitable arrangement of clamping bolts engaging in a curved slot in the bracket 18, the details of which need not be described as they are old and well-known. It will also be understood that the earth working tools can be set at different angles with respect to their supporting arms 19.

Secured in spaced relation to the intermediate portion of the tubular bar 17 are two clamping devices 22 from which depend vertical standards. The lower ends of these two standards have outwardly extending axle spindles upon which are journaled bell wheels 24—24, which straddle the plant row and which support the tool carrying bar 17. Connected to the wheel carrying standards 23, at points preferably adjacent to the outwardly extending spindle portions, are links 25 which extend upwardly and forwardly to a pivoted yoke 26. For the outer units such yoke comprises two spaced straps 26 which extend down on the opposite sides of the channel bar 10, being pivotally connected thereto by the bolt 13 (Figure 3) which extends through both straps 26. Said straps extend down below the channel bar 10 and have their lower ends apertured to receive the ends of the links 25, such links having inwardly turned ends 27 which project through the apertures in the straps from the outer sides of the straps. Pivotally mounted upon such inwardly turned ends, between the straps 26, is a clevis 28 with which a second clevis 29 is linked. The latter clevis has pivotal connection with a doubletree comprising an evener bar, to the outer ends of which singletrees are pivotally connected. It will thus be seen that draft energy effective on the evener bar is transmitted to the lower ends of the straps or yoke members 26, and thence through the links 25 to the bell wheels 24 and to the earth working tools carried by the gang.

The yoke member 26 is held against swinging movement with this draft pull through the instrumentality of a lever 34 which is pivotally supported on a suitable pivot bracket mounted on the upper side of the channel bar 10. The lever carries any suitable latch mechanism adapted to cooperate with a latching sector 35, which sector is formed as part of the pivot bracket on which the lever is mounted. A link 36 is pivotally connected to said lever and extends forwardly for effecting pivotal connection at 37 with the upper end of the yoke 26. The upper ends of the two straps which form said yoke are brought together and the transversely bent end 37 of the link 36 is passed through openings in such ends of the straps. It will be evident from the foregoing that by shifting the lever 34 fore and aft the yoke 26 will be rocked on the bolt 13 as a pivot, which will shift the links 25 and thus swing the bell wheels fore and aft about the pivot bolts 16, thereby swinging the tubular frame bar 17 to move the soil engaging tools 21 into or out of engagement with the ground.

Extending through the tubular bar or shaft 17, and rotatable therein, is a second tool carrying shaft 39. The outer ends of the latter shaft are preferably formed square to have brackets 41 firmly clamped thereon. Bars or arms 42 extend rearwardly from the brackets 41 and carry suitable earth working tools 43. In the arrangement shown, we have illustrated these earth working tools as being shovels, but it will be evident that discs or any other desired type of cultivating devices may be mounted on the arms 42 instead of these shovels. Provision is made for adjusting the two arms 42 of each gang or unit inwardly or outwardly with respect to the unit so as to vary the distance between the earth working tools carried thereby, each such adjustment being secured by a suitable clamping bolt carried by the arm which effects clamping engagement in a curved slot in the bracket 41. This adjustment corresponds more or less to the adjustment provided for the arms 19, and need not be described in detail as it is old and well-known.

The second set of cultivating devices 43, carried by the arms 42, may be given different depth adjustments relative to the first set of cultivating devices 21 through actuation of a lever 44. This lever is fixedly secured to the inner tool carrying shaft 39 on which the brackets 41 are mounted, and said lever is adapted to have latched engagement with a notched sector 45 which is illustrated as being formed integral with the clamping bracket 18. As previously described, such clamping bracket is secured fast to the outer tubular shaft or bar 17, and hence the latched engagement of the lever 44 with the sector 45 will hold the two shafts 17 and 39 in fixed relation in each other. It will be seen from the foregoing that when the lever 34 is actuated the wheel support, comprising the bell wheels 24 and their standards 23, will be shifted fore and aft, and in such movement will raise or lower both sets of cultivating devices 21 and 43, which cultivating devices are carried by the wheel support. It will also be seen that by moving the second lever 44 fore and aft an independent depth adjustment can be given the second set of cultivating devices 43, or these cultivating devices can be raised and lowered for the purpose of shaking trash out of the shovels 43.

Disposed between the two supporting wheels of each gang or unit is a shield 47 which serves to cover the young plants in the bottom of the trench or list, so as to prevent the plants from being covered by the soil or otherwise injured in the cultivating operation. Such shield consists of an inverted angle shaped member, and has draft connection with its gang or unit through the medium of upwardly extending bars 48 which are pivotally connected to the sides of the channel bar 10, as best shown in Figure 2. Said shield is also connected to the tool carrying arms 19 through chains 49.

The stabilizing means for the two outer gangs or units A and B comprises a transversely extending bar 51 and laterally swinging arms or links 52 which pivotally connect the outer portions of the stabilizing bar 51 with the gang units A and B. Each arm or link 52 has a downwardly extending bearing portion, indicated at 53 in Figure 1, which bearing portion extends down into a vertical bearing socket formed in a bracket or plate 54 which is secured to the rear end of the frame channel 10. A relatively long area of bearing engagement is afforded between the bearing portion 53 and the bracket 54 so as to resist twisting stresses set up between the cultivator unit and the arm 52 incident to any tipping tendency of the cultivator unit. Secured to the intermediate portion of the stabilizing bar 51 is the operator's seat 57, from which position the operator can conveniently reach the levers 34 and 44 of the gangs.

The structure which I have thus far described corresponds to a conventional two-row lister cultivator of the type disclosed in the Paul patent previously referred to. Referring now to the connection and operative association of the intermediate cultivator gang C with the two outer gangs A and B, it will be seen from Figure 1 that the intermediate gang is disposed considerably in rear of the transverse plane of the two outer gangs. Such location of the intermediate gang permits all three gangs to swing laterally in following the deviations in the plant rows without interference between the gangs; and also permits the implement to be turned at the ends of the field without the gangs colliding with each other in such turning movement.

As previously remarked, the intermediate gang is in all material respects a duplicate of the outer gangs A and B, only differing therefrom in its draft connections. Referring particularly to Figures 1 and 2, such intermediate gang comprises the frame channel 10 and the pivotally mounted yoke 26, similarly to the outer gangs. Pivotally connected to the outer sides of the yoke bars 26 are a pair of forwardly extending draft members 58. The links 25 have their inwardly turned ends 27 passing through such draft members 58, and through the lower ends of the yoke bars 26, so that the draft pull on the members 58 is transmitted to the links 25, as described of the outer gangs. The draft members 58 extend back beyond the yoke 26 and have their rear ends pivotally connected at 59 to links 61 which extend down from the frame bar 10, such links being pivotally supported on the frame bar to swing with the yoke 26.

Thus the draft members 58 have pivotal connection with the frame bar 10 for the center unit through a system of parallel links, which permits of fore and aft swinging of the wheel support through actuation of the lever 34, as previously described of the outer gangs, and which transmits the draft to the center unit directly to the links 25 just as the draft is transmitted through the clevises 28 and 29 to the links 25 of the outer units. The draft members 58 are thus so disposed far enough below the channel bar 10 for the center unit to bring the ends 27 of the rear links 25 into substantially the same horizontal plane as the clevises 28 and 29, thus applying draft to the rear or center unit at the same point to which draft is applied to the outer units.

The front ends of the draft members 58 have pivotal attachment to the center of a transversely extending draft transmitting structure or draft bar 63. Such pivotal attachment is preferably effected by securing spaced plates 64 to the upper and lower sides of the draft bar, and extending these plates rearwardly therefrom to support a vertical pivot bolt 65. The draft members 58 have looped engagement around the pivot bolt 65 between the plate 64, so that the intermediate gang C is free to swing laterally with reference to the draft bar 63, around the axis of the bolt 65. A truss rod 66 is preferably extended along the bottom of the draft bar 63, such truss rod having its ends secured to the draft bar and having its intermediate portion secured to the lower plate 64.

The draft which is transmitted to the two outer gangs through the doubletrees and clevises 29 is in turn transmitted to the outer ends of the draft bar 63 through swingable draft links 68. As best shown in Figure 3, each of these draft links consist of two bars riveted together and having their ends separated to form a clevis 69 which engages over the upper and lower sides of the draft bar 63. A pivot bolt 71 is extended through alined holes in the clevis 69 and in the draft bar. The front end of each link 68 is pivotally connected to the under side of the adjacent draft pole 12 on the vertical bolt 14, such bolt passing down through an opening in the end of the link 68. It will be apparent that the swinging link connection between the ends of the draft bar 63 and the two outer gangs A and B will transmit an equalized draft between the three gangs while still permitting each gang to swing or shift transversely in following its lister row. That is to say, by virtue of the pivoted link connection between the outer ends of the draft bar 63 and the outer gangs, relative transverse shifting movement can occur between the draft bar and the gangs so as to permit the two outer gangs to swing inwardly or outwardly, or to permit the intermediate gang to swing to either side, all independently of each other.

The stabilizing means for the intermediate gang C comprises a stabilizing bar or link 76 which extends diagonally forwardly from the intermediate unit to one end of the transverse stabilizing bar 51. The rear end of the stabilizing bar 76 has a downwardly extending bearing portion 77 which extends down into the vertical bearing socket formed in the bracket 54 of the gang frame. Thus the rear end of the bar 76 has pivotal attachment with the intermediate unit, similarly to the pivotal attachment of the arms 52 with the laterally disposed units A and B. The front end of the stabilizing bar 76 has a downwardly extending bearing portion 78 which has bearing engagement in a tubular socket 79 carried on the end of the transverse stabilizing bar. It will be evident from the foregoing that the rearwardly extending stabilizing bar 76 will hold the intermediate unit C against lateral tipping, while still permitting lateral deviation of such unit in following the lister row. In such lateral movement, the transverse stabilizing bar 51 will be shifted endwise to one side or the other, on the freely swinging arms 52. Such movement of the transverse stabilizing bar will carry the operator's seat 57 in a direction corresponding to the lateral movement of the intermediate gang, so that irrespective of the degree of such lateral movement the operator will always be able to reach the levers 34 and 44 of such unit conveniently.

It will thus be seen from the foregoing that I have provided a three row lister cultivator wherein draft is applied to the rear or intermediate cultivator unit in substantially the same manner as it is applied to the outer units while yet providing a construction in which the center or rear cultivator unit is effectively held in upright position.

While I have shown and described above the preferred structural embodiment of the present invention, it will be apparent to those skilled in the art that my invention is not to be limited to the specific means shown and described, but that, in fact, widely different means may be employed in the practice of the broader aspects of the present invention as defined by the appended claims.

What I claim, therefore, and desire to secure by Letters Patent is:

1. A lister cultivator having two outer gangs and an intermediate gang, said outer gangs including longitudinally disposed poles, draft means disposed below said poles, for applying draft to said outer gangs, and draft means for applying draft to said intermediate gang at a point in the same horizontal plane as said outer gangs.

2. A lister cultivator having a pair of outer gangs and an intermediate gang having a frame, draft means for the outer gangs, and draft means for the intermediate gang comprising a draft member supported at one end on the outer gangs and at the other end on said intermediate gang and a system of parallel links connecting said member with said frame including means for adjusting the angularity of the parallel links.

3. A lister cultivator having two outer gangs and an intermediate gang having a frame, a transverse draft bar carried by said outer gangs, a longitudinal frame bar connected with said transverse frame bar and disposed beneath the frame of said intermediate gang, and a pair of controlled parallel links connecting said longitudinal draft bar with the frame of said intermediate gang.

4. A lister cultivator having two outer gangs and an intermediate gang, each of said gangs having a longitudinally extending member, means for applying draft to the outer gangs, means for transmitting draft from said outer gangs to said intermediate gang including a longitudinally extending draft member disposed beneath the longitudinally extending member of the intermediate gang, links extending downwardly and connected, respectively, with said longitudinal draft member and the longitudinal member of the intermediate gang, and means for controlling the fore and aft position of the longitudinal member of the intermediate gang relative to the longitudinal draft member.

5. A lister cultivator having two outer gangs and an intermediate gang, means for transmitting draft from the outer gangs to said intermediate gang comprising a longitudinal draft bar, a longitudinal frame bar carried by said intermediate gang, vertical wheel carrying standards pivoted to said frame bar for fore and aft swinging movement, said longitudinal frame bar being disposed above said longitudinal draft bar, links extending downwardly and rearwardly and connected at their upper ends with said draft bar and at their lower ends with said wheel standards, and means for controlling the relative fore and aft position of said bars.

6. A lister cultivator comprising a pair of outer gangs and an intermediate gang, and means for transmitting draft from said outer gangs to said intermediate gang comprising a longitudinal draft member, a longitudinal frame bar carried by the intermediate gang and disposed above said draft member, vertical wheel standards pivotally connected with said frame bar, draft transmitting links extending from said draft member to the lower ends of said standards, an upwardly extending lever connected at its lower end with said draft member and at an intermediate portion with said frame bar, and means carried by said frame bar and connected with the upper end of said lever for swinging the latter to control the vertical position of said frame bar.

7. In a lister cultivator, a central longitudinally extending draft member, a cultivator gang comprising cultivator tools and a longitudinal frame bar disposed above said draft member, link means carried by said draft member and adapted to rigidly connect the same with said frame bar, and means operative by the position of said link means for determining the position of said tools.

8. In a lister cultivator, a central longitudinally extending draft member, a cultivator gang comprising a longitudinal frame bar disposed above said draft member, cultivating tools carried thereby, and vertical standards connected with the frame bar carrying supporting wheels, means connecting said wheels with said draft member, upwardly extending link means connecting said draft member with said frame bar and adapted to hold the draft member and the frame bar in a given angular relation but providing for relative longitudinal displacement, and means controlling the fore and aft swinging of said link means to raise and lower said tools.

9. In a lister cultivator, a central longitudinally extending draft member, a cultivator gang comprising a longitudinal frame bar disposed above said draft member, cultivating tools extending rearwardly from said frame bar, swingably carried supporting wheels for said frame bar, draft means connecting said wheels with said draft member, a pair of controlled parallel links connecting the rear end of said draft member with the forward end of said frame bar, and means mounted on said frame bar for controlling the fore and aft position of said parallel linkage whereby to swing said supporting wheels to raise and lower said tools.

10. In a lister cultivator having two outer gangs, each provided with a longitudinal member, pivoted standards with ground wheels thereon, a downwardly extending lever pivoted on said member and connected with said standards to swing the same, and draft transmitting means connected with the lower end of said lever, the combination of a third gang disposed between said outer gangs, a transverse draft bar supported underneath the longitudinal members of the outer gangs, a longitudinal draft bar connected with said transverse bar for transmitting draft to said third gang, and means comprising an upwardly extending link connecting said longitudinal draft bar with said third gang.

11. In a lister cultivator having two outer gangs, each provided with a longitudinal draft member, pivoted standards, with ground wheels thereon, a downwardly extending lever pivoted on said draft member and connected with said standards to swing the same, and draft transmitting means connected with the lower end of said lever, the combination of a third gang disposed between said outer gangs and comprising a longitudinal frame bar, pivoted standards with ground wheels thereon supporting said frame bar and swingable in a fore and aft direction to raise and lower said frame bar, and cultivating tools carried by said frame bar, a transverse draft bar supported underneath the longitudinal draft members of the outer gangs, a longitudinal draft bar connected with said transverse bar for transmitting draft to said third gang and disposed underneath said frame bar, draft links connecting said longitudinal draft bar with said supporting wheels, and a lever comprising two spaced members having their lower ends pivoted to said longitudinal draft bar and extending upwardly therefrom and connected with said frame bar and operative to control the fore and aft position of the frame bar relative to said longitudinal draft bar.

12. In a lister cultivator having two outer gangs, each provided with a longitudinal draft member, pivoted standards with ground wheels thereon, a downwardly extending lever pivoted on said draft member and connected with said standards to swing the same, and draft transmitting means connected with the lower end of said lever, the combination of a third gang comprising a longitudinal frame bar and vertical wheel carrying standards supporting said frame bar and swingably mounted, a transverse draft bar supported underneath the longitudinal draft members of the outer gangs, a longitudinal draft bar connected at its forward end with said transverse bar for transmitting draft to said third gang, a pair of draft transmitting links connected with the lower end of said swingable standards and extending forwardly and upwardly and pivoted to said longitudinal draft bar and adjacent the rear end thereof, a lever pivotally connected at its lower end with said longitudinal draft bar for movement about a pivot axis coincident with the pivot axis of the forward ends of said draft links, means pivotally connecting the intermediate portion of said lever with said frame bar, and means carried by the latter and connected with the upper end of said lever for controlling the fore and aft position of the frame bar relative to said longitudinal draft bar whereby to raise and lower the frame bar of the third intermediate gang.

13. In a lister cultivator having two outer gangs, an intermediate gang having a frame, the combination of a transverse draft bar carried by said outer gangs, a longitudinal draft bar connected with said transverse frame bar and spaced vertically with respect to the frame of said intermediate gang, and controlled link means connecting said longitudinal draft bar with the frame of said intermediate gang.

14. In a lister cultivator having two outer gangs, an intermediate gang having a frame, the combination of a transverse draft bar carried by the outer gangs, a longitudinal draft bar connected at its forward end with said transverse bar and having its rear end disposed beneath the frame of the intermediate gang, upwardly extending link means pivotally connecting the longitudinal draft bar with the frame of said intermediate gang, and means carried by the latter for adjusting the position of said link means.

15. In a lister cultivator, a cultivator unit having a longitudinally extending frame member, means for transmitting draft to said unit comprising a longitudinally extending draft member disposed beneath said longitudinally extending frame member, links extending downwardly and connected, respectively, with said longitudinal draft member and the longitudinal frame member and adapted to rigidly connect said members together, and means for controlling the fore and aft position of the longitudinal frame member relative to the longitudinal draft member.

16. In a lister cultivator, a cultivator unit having a longitudinally extending frame bar, vertical wheel carrying standards pivoted to said frame bar for fore and aft swinging movement, a longitudinal draft bar disposed above said longitudinal frame bar, links extending downwardly and rearwardly and connected at their upper ends with said draft bar and at their lower ends with said wheel standards, and means for controlling the relative fore and aft position of said bars.

17. In a lister cultivator, a cultivator unit having a longitudinally extending frame bar, a longitudinal draft bar disposed below said longitudinal frame bar, vertical wheel carrying standards pivotally connected with said frame bar for fore and aft swinging movement, link means connecting the draft bar with said standards whereby relative fore and aft movement between the frame bar and the draft bar shifts said wheel carrying standards, longitudinally spaced link means connecting the frame bar and the draft bar for relative longitudinal movement, but providing for maintaining said bars in given angular relation, and means for controlling the angular position of said links relative to one of said bars for controlling the fore and aft movement therebetween.

18. In a lister cultivator, a central longitudinally extending draft member, a cultivator gang comprising a longitudinal frame bar disposed above said draft member, means including rigidly connected links for connecting the frame bar with said draft member, said links being shiftable to permit fore and aft movement of the frame bar with respect to the draft member, and means controlled by the relative fore and aft adjustment of the frame bar and draft member for raising and lowering the frame bar relative to the ground.

19. In a lister cultivator, a central longitudinally extending draft member, a cultivator gang comprising a longitudinal frame bar disposed above said draft member, and means connecting the frame bar with the draft member and shiftable to permit relative fore and aft movement therebetween, said means comprising two pairs of laterally spaced link members, the lower ends of the links of each pair being pivotally connected with said draft member and the upper portions of said links being pivotally connected with said frame bar, and means associated with at least one pair of links for optionally retaining the same in a given angular relation with respect to one of said members.

20. In a lister cultivator, a central longitudinally extending draft member, a cultivator gang comprising a longitudinal frame bar disposed above said draft member, and means connecting the frame bar with the draft member and shiftable to permit relative fore and aft movement therebetween, said means comprising two pairs of laterally spaced link members, the lower ends of the links of each pair being pivotally connected with said draft member and the upper portions of said links being pivotally connected with said frame bar, and means including an adjustable lever connected with the frame member and with the forward pair of links to retain said links in a given angular relation with respect to said frame member for preventing relative fore and aft movement between said frame member and the draft member.

21. In a lister cultivator, a central longitudinally extending draft member, a cultivator gang comprising a longitudinal frame member disposed above said draft member, two pairs of laterally spaced links connecting said frame member and draft member for parallel movement, said links being connected with the lateral edges of said members, and means for fixing said links in angular position to prevent relative fore and aft movement between said frame and draft members.

22. In a lister cultivator, a longitudinally extending draft member, a cultivator gang comprising a longitudinal frame member disposed in vertically spaced relation with respect to said draft member, two pairs of laterally spaced links connecting said members and shiftable to provide for fore and aft adjustment of said members, and means carried by one of said members and connected with at least one pair of said links for rigidly fixing the latter in position to prevent relative fore and aft movement between said members.

23. In a lister cultivator, a longitudinally extending draft member, a cultivator gang comprising a longitudinal frame member disposed in vertically spaced relation with respect to said draft member, cultivating tools carried by said frame member, and vertical standards pivotally connected with the frame member and carrying supporting wheels, link means connecting said standards with said draft member, two pairs of generally vertically extending links connecting the frame member and the draft member, the pairs of links being disposed in fore and aft spaced relation and the links of each pair being pivotally connected with the lateral edges of said members, and means controlling the angular relation between said links and said members to swing said standards about their pivotal connection to raise and lower said tools.

WALTER H. SILVER.